US008562446B2

United States Patent
Nishitani

(10) Patent No.: US 8,562,446 B2
(45) Date of Patent: Oct. 22, 2013

(54) TORSION VIBRATION DAMPING APPARATUS

(75) Inventor: Toru Nishitani, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/502,267

(22) PCT Filed: Apr. 1, 2011

(86) PCT No.: PCT/JP2011/001982
§ 371 (c)(1),
(2), (4) Date: Apr. 16, 2012

(87) PCT Pub. No.: WO2012/137234
PCT Pub. Date: Oct. 11, 2012

(65) Prior Publication Data
US 2012/0322565 A1    Dec. 20, 2012

(51) Int. Cl.
*F16F 15/123*    (2006.01)

(52) U.S. Cl.
USPC .............................. 464/68.1; 464/46; 192/214

(58) Field of Classification Search
USPC .............. 464/46, 68.1, 68.9, 68.92; 192/56.1, 192/56.6, 212–214.1, 30 V, 55.2–55.7, 192/200–211
See application file for complete search history.

(56) References Cited

U.S. PATENT DOCUMENTS

| | | | |
|---|---|---|---|
| 4,884,996 A * | 12/1989 | Schmitt et al. ............... | 464/68.9 |
| 5,401,213 A * | 3/1995 | Muchmore et al. | |
| 5,941,354 A | 8/1999 | Fukushima et al. | |
| 7,267,211 B2 * | 9/2007 | Yamashita et al. ........ | 464/68.1 X |
| 7,377,853 B2 * | 5/2008 | Takeuchi et al. ................ | 464/46 |
| 7,425,181 B2 * | 9/2008 | Nakagaito et al. .............. | 464/46 |

(Continued)

FOREIGN PATENT DOCUMENTS

| | | |
|---|---|---|
| JP | 10-213204 A | 8/1998 |
| JP | 2002-081505 A | 3/2002 |

(Continued)

OTHER PUBLICATIONS

International Search Report of PCT/JP2011/001982, dated May 10, 2011.

*Primary Examiner* — Gregory Binda
*Assistant Examiner* — Josh Skroupa
(74) *Attorney, Agent, or Firm* — Sughrue Mion, PLLC

(57) ABSTRACT

A torsion vibration damping apparatus can prevent the strengths of its projection portions from being decreased even if the torsion vibration damping apparatus is made small in size, and can damp torsion vibration caused by a transitional torque when a hub member is rotated in the positive side relatively rotated with respect to a rotation member, thereby making it possible to enhance a damping property of the torsion vibration. The projection amount of a projection portion 40A circumferentially projecting in the positive side from the radially center axis O of the projection portion of a hub flange 40 is formed smaller than the projection amount of the projection 40A circumferentially projecting in the negative side from the radially center axis O of the projection portion. The distance L1 between the positive side surface 40b of the projection portion 40A and the stopper portion 48 is longer than the distance L2 between the negative side surface 40c of the projection portion 40A and the stopper portion 48 when the hub member 31 and the disc members 32, 33 are at their neutral positions.

6 Claims, 13 Drawing Sheets

(56) References Cited

U.S. PATENT DOCUMENTS

| | | | |
|---|---|---|---|
| 8,287,391 B2* | 10/2012 | Jung | 464/68.9 |
| 8,313,385 B2* | 11/2012 | Mundt et al. | 464/68.8 |
| 2002/0019263 A1 | 2/2002 | Jackel et al. | |
| 2005/0096138 A1 | 5/2005 | Takeuchi et al. | |
| 2011/0315502 A1* | 12/2011 | Antchak et al. | |

FOREIGN PATENT DOCUMENTS

| | | |
|---|---|---|
| JP | 2002-372101 A | 12/2002 |
| JP | 2004-003678 A | 1/2004 |
| JP | 2006-090425 A | 4/2006 |
| JP | 2007-285335 A | 11/2007 |
| JP | 2008-002545 A | 1/2008 |

* cited by examiner

US 8,562,446 B2

TORSION VIBRATION DAMPING APPARATUS

CROSS REFERENCE TO RELATED APPLICATIONS

This application is a National Stage of International Application No. PCT/JP2011/001982 filed Apr. 1, 2011, the contents of all of which are incorporated herein by reference in their entirety.

TECHNICAL FIELD

This invention relates to a torsion vibration damping apparatus, and in particular to a torsion vibration damping apparatus to be mounted on a vehicle and capable of damping vibration while transmitting driving force through a resilient member intervening between a boss member and a rotation member.

BACKGROUND OF TECHNOLOGY

There has so far been known a torsion vibration damping apparatus which is adapted to connect a drive source such as an internal combustion engine and an electric motor with wheels to transmit the torque from the drive source to the wheels, and to absorb torsion vibration between the drive source and a drive transmission system having transmission gear assemblies.

As a conventional torsion vibration damping apparatus of this kind, there has so far been known an apparatus (for example see Patent Document 1) as shown in FIG. 12. In FIG. 12, the known torsion vibration damping apparatus 1 is provided with a hub member 4 having a hub flange 3 formed with a plurality of projections 2 radially extending and circumferentially spaced apart from one another through recesses 2a. The inner peripheral portion of the hub member 4 is splined to an input shaft forming part of a transmission included in a drive transmission system.

In the axial direction of the hub member 4 is provided a pair of disc plates 5, 6 which are in coaxial relationship with the hub member 4 to have the hub member 4 intervene between the disc plates 5, 6 in such a manner that the disc plates 5, 6 are relatively rotatable with the hub member 4 to which the torque is transmitted from the drive source such as the internal combustion engine.

The disc plates 5, 6 are respectively formed with accommodation holes 5a, 6a in opposing relationship with the recesses 2a. In the recesses 2a and the accommodation holes 5a, 6a are respectively arranged coil springs 7 in such a manner that the both circumferential end portions of the coil springs 7 are engaged with and compressed by the projection portions 2, so that the coil springs 7 are retained by the projection portions 2.

The torsion vibration damping apparatus 1 is operative to have the coil springs 7 resiliently deformed when the hub member 4 is twisted (relatively rotated) in the positive side, i.e., an acceleration side of the vehicle with respect to the disc plates 5, 6 and twisted in the negative side, i.e., a deceleration side of the vehicle with respect to the disc plates 5, 6, thereby damping the vibration between the internal combustion engine and the drive transmission system while the torque is being transmitted between the hub member 4 and the disc plates 5, 6.

The disc plates 5, 6 are provided with a plurality of stoppers 8 positioned on the paths of the projection portions 2 in such a manner that the stoppers 8 are engageable with the circumferential side surfaces of the projection portions 2 to regulate the relative rotations of the hub member 4 and the disc plates 5, 6.

Accordingly, the coil springs 7 can be prevented from excessively compressed and thus can prevent the coil springs 7 from being damaged and deteriorated in property.

On the other hand, it is well known that there are generated noises by the torsion vibration at the time of the vehicle cruising. The noises include cluttering sounds of gears generated by the torsion vibration stemmed from the rotation fluctuation caused by the torque fluctuation of the drive source during the times of the vehicle accelerated and decelerated, and by the collision of the idling gear pairs of the transmission gear assembly caused by the torsion resonance of the drive transmission system.

Further, there has occasionally been generated a large torsion vibration with a transitional torque inputted into the hub member when the hub member 4 is twisted in the positive side with respect to the disc plates 5, 6 in such a situation as causing the wheels to be fluctuated in speeds during the acceleration stage of the vehicle.

More concretely, as shown in FIG. 13, the torque is gradually raised as shown in a broken line when the vehicle is cruising on a flat road at the time of the acceleration stage, while the torque is fluctuated and raised as shown in a solid line when the vehicle is cruising on a bad road such as a rugged road and the like at the time of the acceleration stage.

This is due to the fact that the speed fluctuations of the wheels are generated when the vehicle is cruising on the bad road rather than the flat road. Therefore, when the condition under which the vehicle is cruising on the flat road is transferred to the condition under which the vehicle is cruising on the bad road, the large torque is transitionally inputted to the drive transmission system at the time of the vehicle being accelerated, thereby leading to generating a large torsion vibration.

For this reason, in order to damp the large torsion vibration caused by the transitional torque inputted to the drive transmission system at the time of the vehicle being accelerated, it is effective that the coil spring 7 is of low rigidity and has an enlarged torsion angle in its positive side. For making the coil spring 7 to be of low rigidity, the coil spring 7 is made large in its circumferential direction, thereby making it possible to easily operate the apparatus.

PRIOR ART DOCUMENTS

Patent Documents

Patent Document 1: Patent Publication No. 2006-90425

SUMMARY OF INVENTION

Problems to be Solved

The previously mentioned conventional torsion vibration damping apparatus is required to make the torsion angle of the coil spring 7 in the acceleration side larger than the torsion angle of the coil spring 7 in the deceleration side in order to damp the torsion vibration caused by the transitional torque at the time of the vehicle being accelerated.

However, the conventional torsion vibration damping apparatus has the torsion angles, i.e., the torsion properties of the coil spring 7 in the acceleration side and the deceleration side identical to each other, thereby leading to having the torsion angle of the coil spring 7 in the deceleration side enlarged if the torsion angle of the coil spring 7 is enlarged in the acceleration side.

The coil spring 7 is positioned between the projection portions 2 and assembled in the recess 2a, thereby leading to making the torsion vibration damping apparatus 1 large in size if the coil spring 7 is lengthened in the circumferential direction thereof.

On the other hand, it may be considered that the circumferential width of the projection portion 2 is shortened for making the torsion vibration damping apparatus small in size to enlarge the torsion property of the coil spring 7. However, the shortened circumferential width of the projection portion 2 leads to lowering the strength of the projection portion 2, thereby making it difficult for the coil spring 7 to be retained in the stable state.

As a consequence, when the transitional torque is inputted to the acceleration side of the torsion vibration damping apparatus 1 at the time of the vehicle being accelerated in the case of the torsion vibration damping apparatus 1 being made not large in size, there is caused such a problem that the vibration can not be sufficiently damped, thereby leading to causing a problem of deteriorating the damping property of the torsion vibration.

The present invention is made to overcome the previously mentioned conventional problem, and it is therefore an object of the present invention to provide a torsion vibration damping apparatus which can prevent the strength of the projection portion from being lowered even if the torsion vibration damping apparatus is made small in size, and can damp the torsion vibration caused by the transitional torque when the hub member is relatively rotated in the positive side with respect to the rotation member, thereby enhancing the damping property of the torsion vibration.

Means for Solving Problems

To achieve the foregoing object, the torsion vibration damping apparatus according to the present invention comprises a hub member having a hub flange formed with a plurality of projection portions radially extending and circumferentially spaced apart from one another through recesses, a rotation member coaxially provided and relatively rotatable with the hub member, and formed with accommodation holes positioned in opposing relationship with the recesses, respectively, a plurality of resilient members respectively arranged in the recesses and the accommodation holes, and resiliently deformable to establish a torque transmission between the hub member and the rotation member when the hub member is circumferentially rotated in its positive and negative sides relatively with respect to the rotation member from its neutral position in which the hub member is not rotated relatively with respect to the rotation member, and a stopper portion provided on the rotation member to be positioned on the rotation path of the projection portion, and engageable with the circumferential side surfaces of the projection portion to regulate the relative rotation of the hub member and the rotation member when the hub member is rotated in the positive and negative sides relatively with respect to the rotation member, the projection portion being formed with a projection amount circumferentially projected in the positive side from the radially central axis of the projection portion being smaller than a projection amount circumferentially projected in the negative side from the radially central axis of the projection portion, and the distance between the positive circumferential side surface of the projection portion and the stopper portion being longer than the distance between the negative side circumferential side surface of the projection portion and the stopper portion.

By the reason that the torsion vibration damping apparatus according to the present invention is constructed in such a manner that circumferentially projected in the positive side from the radially central axis of the projection portion being smaller than a projection amount circumferentially projected in the negative side from the radially central axis of the projection portion, and that the distance between the positive circumferential side surface of the projection portion and the stopper portion is longer than the distance between the negative side circumferential side surface of the projection portion and the stopper portion when the hub member and the rotation member are at their neutral positions, the torsion angle of the hub member and the resilient member in the acceleration side (positive side) can be made larger than the torsion angle of the hub member and the resilient member in the deceleration side (negative side) when the torsion vibration damping apparatus is mounted on the vehicle.

Accordingly, the circumferentially long resilient member can be arranged in the recess between the projections. Therefore, the deformation amount of the resilient member can be made large and the rigidity of the resilient member can be lowered in the case that the speed fluctuation of the wheels is generated to have the transitional torque inputted to the drive transmission system, such as when the condition under which the vehicle is cruising on the flat road is transferred to the condition under which the vehicle is cruising on the bad road at the time of the vehicle being accelerated.

Therefore, the large torsion vibration caused by the transitional torque can be damped, thereby making it possible to enhance the torsion vibration at the time of the vehicle being accelerated.

Only the fact that the projection amount of the projection portion circumferentially projecting in the positive side from the radially center axis of the projection portion is formed smaller than the projection amount of the projection circumferentially projecting in the negative side from the radially center axis of the projection portion, makes it possible to have the torsion angle in the acceleration side made larger than the torsion angle in the deceleration side. This means that the circumferential width of the projection can be shortened to prevent the strength of the projection from being lowered and to make the torsion vibration damping apparatus small in size.

Preferably, the torsion vibration damping apparatus according to the present invention may be constructed in such a manner that each of the resilient members has both circumferential end portions provided with sheet members, respectively, and the resilient member is arranged in each of the recesses in such a manner that the circumferential one end portion of the resilient member is engageable with the positive circumferential side surface of the projection portion through one of the sheet members, and the circumferential other end portion of the resilient member is engageable with the negative circumferential side surface of the projection portion through the other of the sheet members.

In the torsion vibration damping apparatus, only the shortened circumferential width of the projection in the acceleration side makes it possible to make the torsion angle in the acceleration side larger than the torsion angle in the deceleration side, and thus to prevent the strength of the projection from being lowered even if the circumferentially long resilient member is arranged in the recess between the projections.

Preferably, the torsion vibration damping apparatus according to the present invention may be constructed in such a manner that the relative rotation amount of the hub member rotated from the neutral position in the positive side relatively with respect to the rotation member to its position in which the positive circumferential side surface of the projection portion is brought into engagement with the stopper portion is made larger than the relative rotation amount of the hub member rotated from the neutral position in the negative side relatively with respect to the rotation member to its position in which the negative side circumferential surface of the projection portion is brought into engagement with the stopper portion.

In the torsion vibration damping apparatus, only the shortened circumferential width of the projection in the acceleration side makes it possible to make the torsion angle (relative rotation amount) in the acceleration side larger than the torsion angle in the deceleration side, and thus to arrange the circumferentially long resilient member in the recess between the projections while preventing the strength of the projection from being lowered. Accordingly, the torsion rigidity of the resilient member in the acceleration side can be lowered, thereby making it possible to enhance the torsion vibration damping property in the acceleration side.

Preferably, the torsion vibration damping apparatus according to the present invention may be constructed in such a manner that the deformation amount of the resilient member deformed when the positive circumferential side surface of the projection portion is brought into engagement with the stopper portion is made larger than the deformation amount of the resilient member deformed when the negative circumferential side surface of the projection portion is brought into engagement with the stopper portion.

In the torsion vibration damping apparatus, the deformation amount of the resilient member can be made large and the rigidity of the resilient member can be lowered, thereby making it possible to enhance the torsion vibration damping property in the case that the speed fluctuation of the wheels is generated to have the transitional torque inputted to the drive transmission system, such as when the condition under which the vehicle is cruising on the flat road is transferred to the condition under which the vehicle is cruising on the bad road at the time of the vehicle being accelerated.

Preferably, the torsion vibration damping apparatus according to the present invention may be constructed in such a manner that the radially outer peripheral portion of the rotation member is provided with a limiter portion held in frictional engagement with a transmission member to which torque is transmitted from a drive source, and the hub member is connected with an input shaft of a drive transmission system, the limiter portion being frictionally slidable with respect to the transmission member when the torque generated between the transmission member and the input shaft exceeds a predetermined value.

In the torsion vibration damping apparatus, the limiter portion can slide with respect to the transmission member when the torque between the transmission member and the input shaft exceeds the predetermined value. Accordingly, it is possible to prevent the transitional torque from being transmitted between the internal combustion engine and the drive transmission system when the hub member is twisted in the acceleration and deceleration sides with respect to the rotation member, thereby making it possible to protect the torsion vibration damping apparatus.

Preferably, the torsion vibration damping apparatus according to the present invention may be constructed in such a manner that the torque from the drive source of a vehicle is transmitted to the rotation member, and the hub member is connected with the input shaft of the drive transmission system, the hub member being twisted in the positive side with respect to the rotation member when the vehicle is being accelerated and in negative side with respect to the rotation member when the vehicle is being decelerated.

In the torsion vibration damping apparatus, it possible to make the torsion angle in the acceleration side larger than the torsion angle in the deceleration side, and thus to arrange the circumferentially long resilient member in the recess between the projections. The deformation amount of the resilient member can be made large and the rigidity of the resilient member can be lowered, in the case that the speed fluctuation of the wheels is generated to have the transitional torque inputted to the drive transmission system, such as when the condition under which the vehicle is cruising on the flat road is transferred to the condition under which the vehicle is cruising on the bad road at the time of the vehicle being accelerated.

Accordingly, the torsion vibration damping apparatus according to the present invention can damp the large torsion vibration caused by the transitional torque when the hub member is relatively rotated in the positive side with respect to the rotation member, thereby enhancing the damping property of the torsion vibration.

Only the fact that the projection amount of the projection portion circumferentially projecting in the positive side from the radially center axis of the projection portion is formed smaller than the projection amount of the projection circumferentially projecting in the negative side from the radially center axis of the projection portion, makes it possible to have the torsion angle in the acceleration side made larger than the torsion angle in the deceleration side. This means that the circumferential width of the projection can be shortened to prevent the strength of the projection from being lowered and to make the torsion vibration damping apparatus small in size.

Effect of Invention

According to the present invention, it is possible to provide a torsion vibration damping apparatus which can prevent the strength of the projection portion even if the torsion vibration damping apparatus is made small in size, and can damp the torsion vibration caused by the transitional torque when the hub member is relatively rotated in the positive side with respect to the rotation member, thereby enhancing the damping property of the torsion vibration.

EMBODIMENTS TO PERFORM INVENTION

One embodiment of the torsion vibration damping apparatus according to the present invention will be explained hereinafter with reference to the drawings.

FIGS. 1 to 11 are views showing one embodiment of the torsion vibration damping apparatus according to the present invention. For example, the torsion vibration damping apparatus according to the one embodiment is positioned to intervene between an output shaft of an internal combustion engine mounted on a hybrid vehicle and a drive transmission system provided with a driving force splitting mechanism for splitting driving forces to an electric motor and a wheel side output shaft.

The construction of the torsion vibration damping apparatus will first been explained hereinafter.

Figure 1:
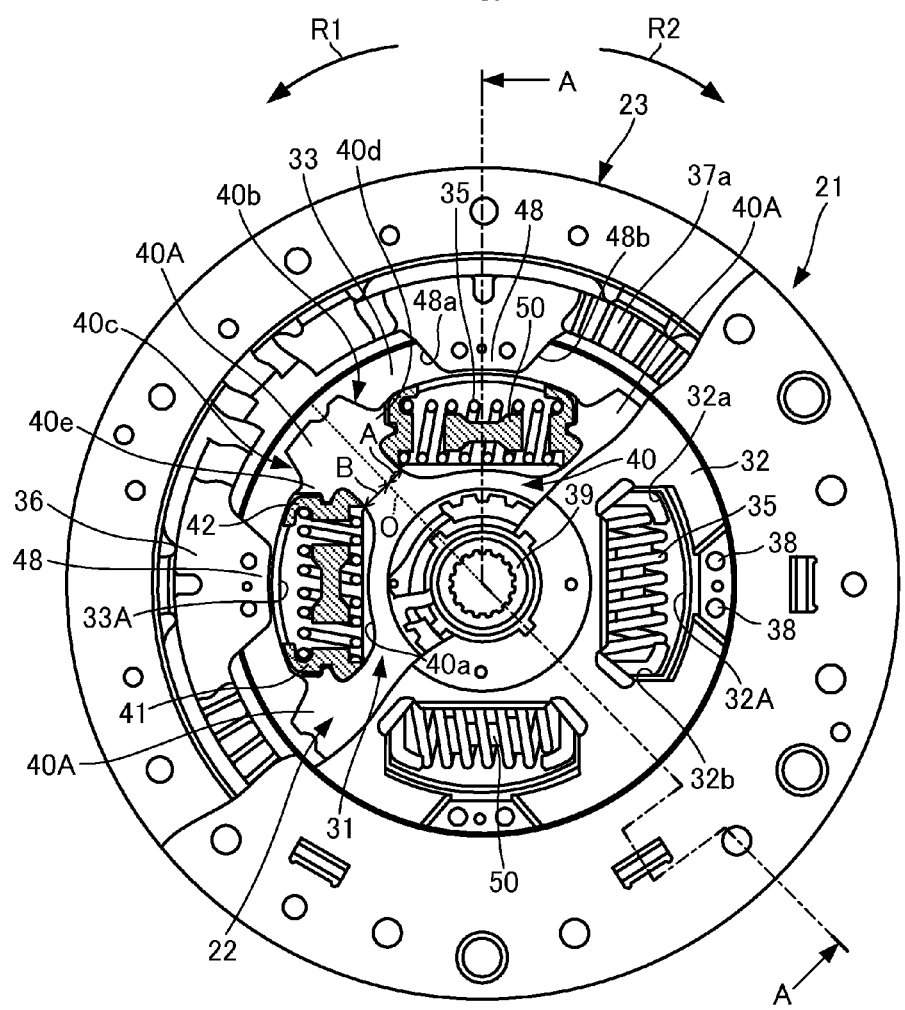
FIG. 1 is a view showing one embodiment of a torsion vibration damping apparatus according to the present invention, and is a front view of the torsion vibration damping apparatus.
Figure 2:
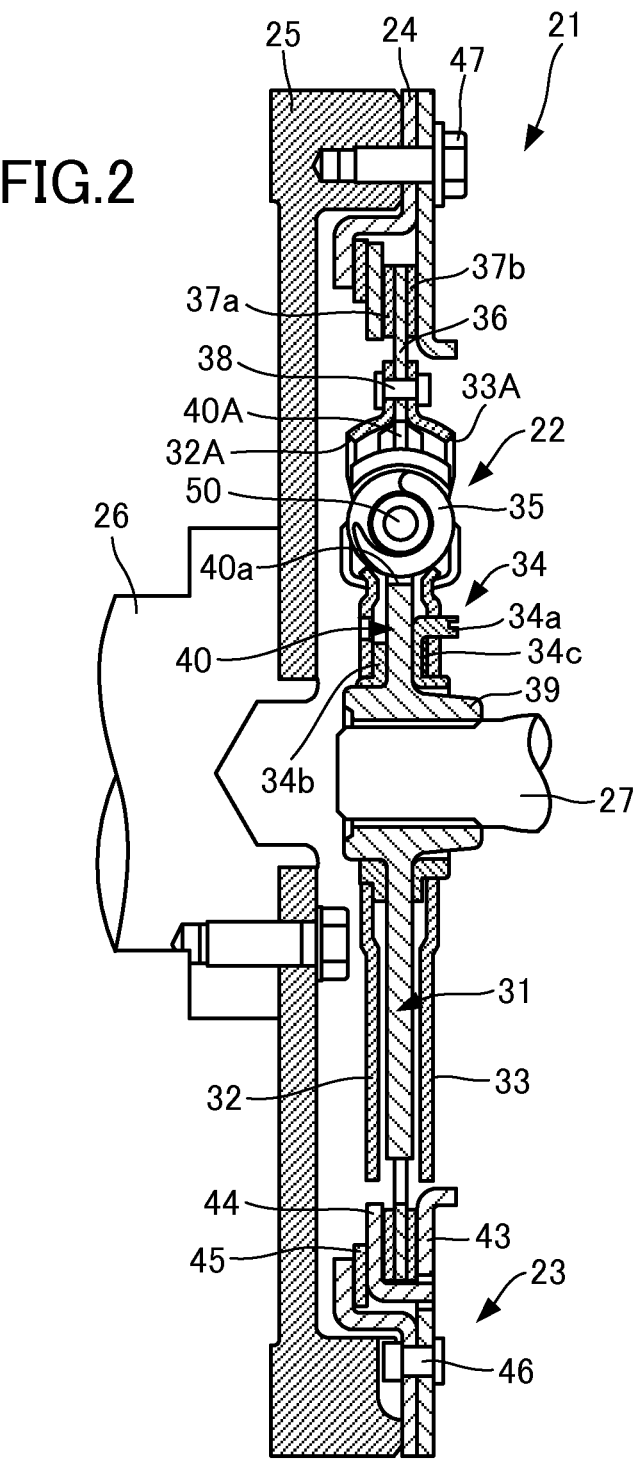
FIG. 2 is a view showing one embodiment of the torsion vibration damping apparatus according to the present invention, and is a cross sectional view taken along the line A-A of FIG. 1 and seen from the arrows on the line A-A.

In FIGS. 1 and 2, the torsion vibration damping apparatus 21 is constructed to comprise a damper mechanism 22 and a limiter portion 23. The limiter portion 23 is connected with a flywheel 25 serving as a transmission member through a support member 24.

The support member 24 is a member for supporting a disc spring 45 which will be described hereinafter, and is constructed to be rotated integrally with the flywheel 25 connected with an output shaft 26 of the internal combustion engine serving as a drive source. The damper mechanism 22 serves to absorb torque fluctuations of the flywheel 25 fixed to the output shaft 26.

The limiter portion 23 is adapted to limit the driving force transmission to the input shaft 27 from the output shaft 26 when the torque between the damper mechanism 22 and the flywheel 25 reaches a predetermined value (limit torque value).

The damper mechanism 22 is constructed to comprise a hub member 31, disc plates 32, 33 serving as a rotation member, a thrust member 34, coil springs 35 each serving as a resilient member, a disc 36, friction members 37a, 37b, and rivets 38.

The hub member 31 is constructed to comprise a boss 39 splined to the outer peripheral surface of the input shaft 27 of the transmission included in the drive transmission system, and a hub flange 40 radially outwardly extending from the boss 39 and formed with a plurality of projection portions 40A circumferentially spaced apart from one another through recesses 40a. Thus, the hub member 31 is integrally rotated with the input shaft 27.

In each of the recesses 40a of the hub flange 40 is arranged a coil spring 35 in such a manner that one circumferential end portion of the coil spring 35 is held in engagement with one circumferential side surface of the projection portion 40A through a sheet member 41, and the other circumferential end portion of the coil spring 35 is held in engagement with the other circumferential side surface of the projection portion 40A through a sheet member 42.

This means that the coil spring 35 is arranged in each of the recesses 40a in such a manner that the coil spring 35 is held in engagement with the one circumferential side surface and the other circumferential side surface of the projection portion 40A through the sheet members 41, 42. Hereinafter, the one circumferential side surface of the projection portion 40A will be expressed a positive side surface 40b, while the other circumferential side surface of the projection portion 40A will be expressed a negative side surface 40c.

Figure 3:
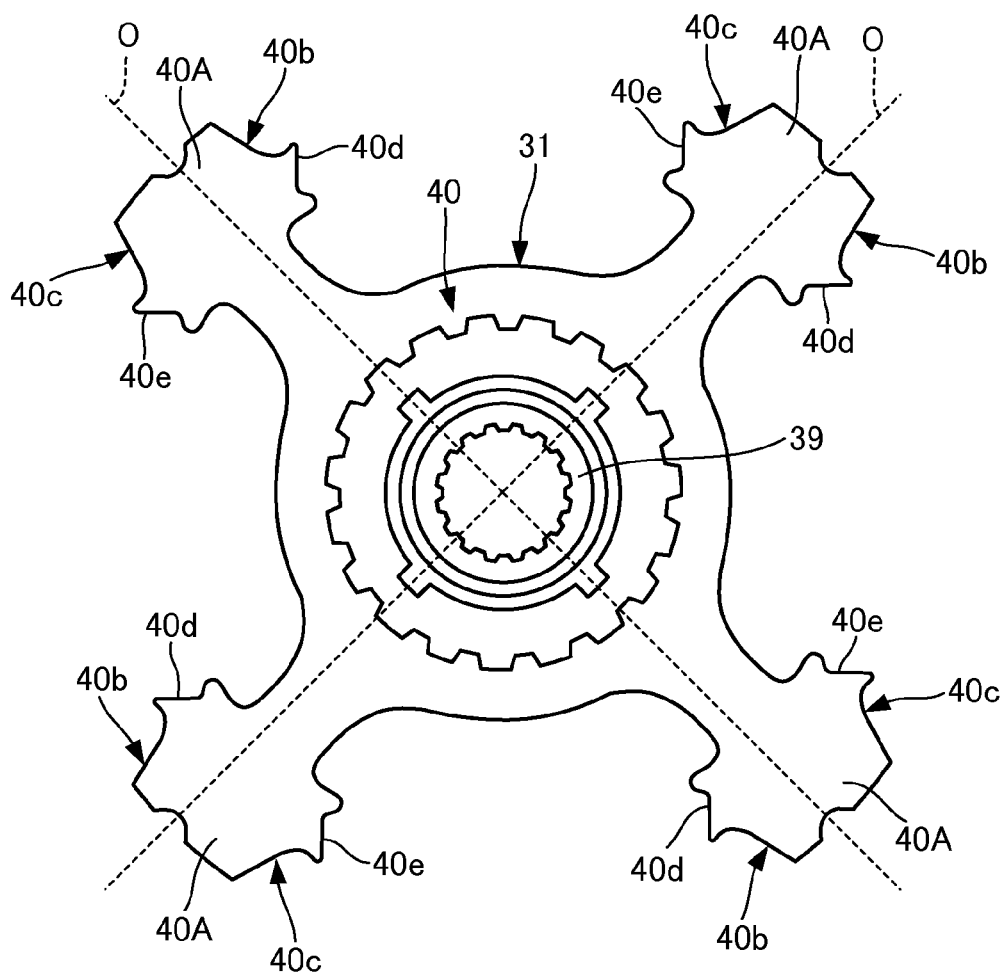
FIG. 3 is a view showing one embodiment of the torsion vibration damping apparatus according to the present invention, and is a front view of a hub member.

As shown in FIGS. 1 and 3, the positive side surface 40b of the projection portion 40A is formed with a fit portion 40d to be fitted with the circumferential end portion of the sheet member 41. Further, the negative side surface 40c of the projection portion 40A is formed with a fit portion 40e to be fitted with the circumferential end portion of the sheet member 42.

Here, the term "circumferential" is intended to mean a circumferential direction identical to the rotation direction of the hub member 31 and the disc plates 32, 33, while the term "radial" is intended to mean a radial direction identical to the radial direction of the hub member 31 and the disc plates 32, 33.

Further, the recesses 40a are formed in the hub flange 40 in such a manner that the radially outer surfaces of the sheet members 41, 42 are positioned radially inwardly of the radially outer end of the projection portion 40A. This means that each of the recesses 40a occupies a space between the projections 40A.

Between the sheet members 41, 42 is provided a torsion damper 50 which is constructed to be resiliently deformed while being held in engagement with the sheet members 41, 42 under the condition that the coil spring 35 is compressed to a level exceeding a predetermined amount.

When the torsion damper 50 is resiliently deformed together with the coil spring 35, the torsion rigidities of the hub member 31 and the disc plates 32, 33 are increased.

The disc plates 32, 33 are positioned in axially spaced-apart and opposing relationship with each other to have the hub member 31 intervene between the disc plates 32, 33 and to be coaxial with and relatively rotatable with the hub member 31. The disc plates 32, 33 are connected at their outer peripheral sides with each other by rivets 38. The disc 36 is positioned between and connected with the disc plates 32, 33 by the rivets 38.

The disc plates 32, 33 are formed with accommodation holes 32A, 33A in axially opposing relationship with the recesses 40a, and the coil springs 35 are arranged in the recesses 40a and the accommodation holes 32A, 33A, respectively.

The accommodation holes 32A, 33A are punched at the outer peripheral sides of the coil springs 35 by press punching operation, and thus have both respective circumferential end portions closed in the circumferential directions of the disc plates 32, 33.

Figure 5:
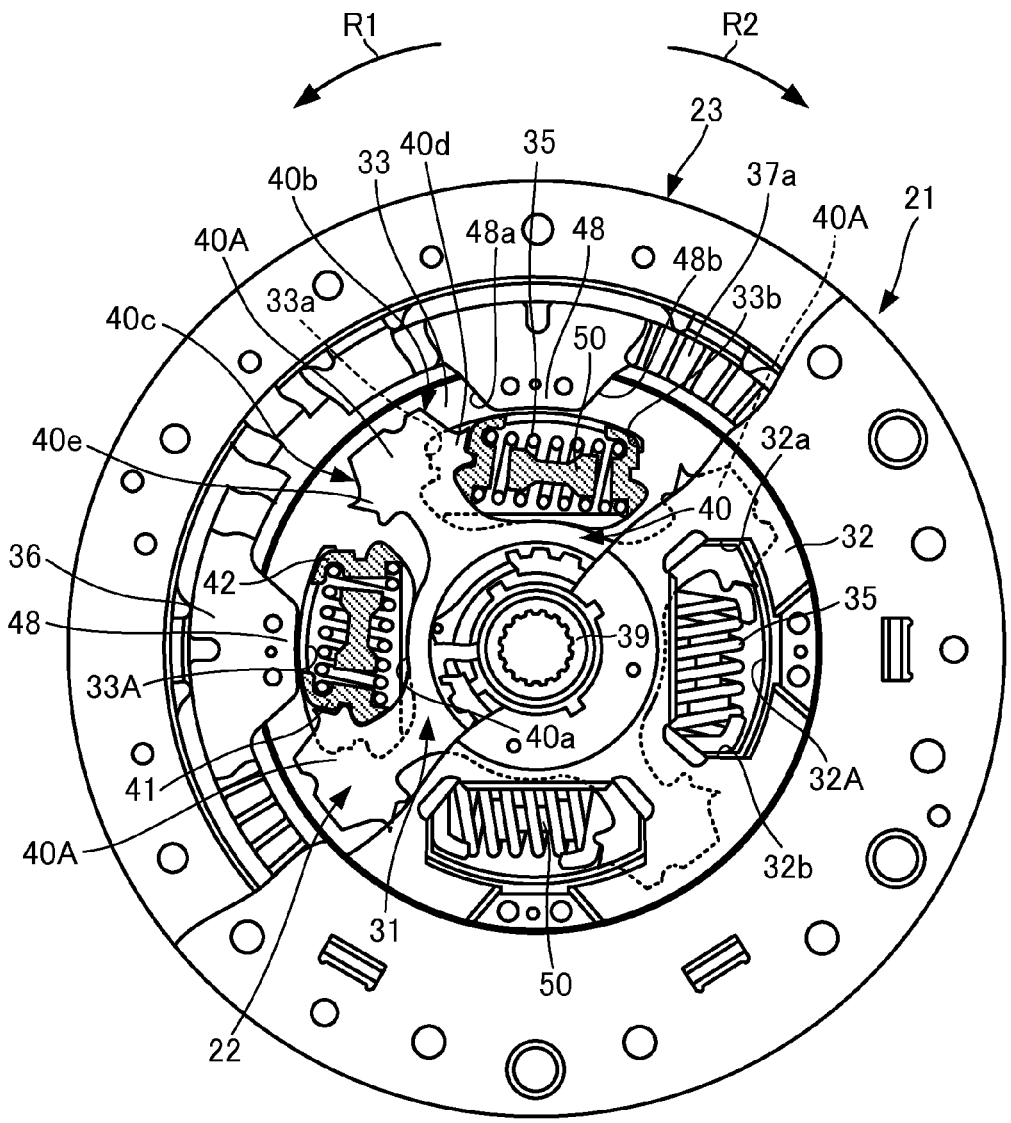
FIG. 5 is a view showing one embodiment of the torsion vibration damping apparatus according to the present invention, and is a view showing a state in which the hub member is twisted in the acceleration side with respect to disc plates.

As shown in FIGS. 1 and 5, the closed ends of the circumferential both end portions of the accommodation holes 32A, 33A of the disc plates 32, 33 constitute end portions 32a, 32b, 33a, 33b engageable with the circumferential end portions of the sheet members 41, 42, so that the circumferential end portions of the sheet members 41, 42 are engageable with the end portions 32a, 32b, 33a, 33b of the accommodation holes 32A, 33A in the state that the sheet members 41, 42 are circumferentially moved away from each other.

The coil springs 35 are provided to intervene between the hub member 31 and the disc plates 32, 33 and capable of being resiliently deformed from the neutral position in which the hub member 31 is not relatively rotated with respect to the disc plates 32, 33 to the states in which the hub member 31 is relatively rotated in the positive side circumferential direction (hereinafter simply referred to as a positive side) with respect to the disc plates 32, 33 and in which the hub member 31 is relatively rotated in the negative side circumferential direction (hereinafter simply referred to as a negative side) with respect to the disc plates 32, 33, thereby making it possible to establish a torque transmission between the hub member 31 and the disc plates 32, 33.

The relative rotation of the hub member 31 in the positive and negative sides with respect to the disc plates 32, 33 will be represented hereinafter by the hub member 31 being twisted in the positive and negative sides with respect to the disc plates 32, 33.

The thrust member 34 is constituted by a friction member roughly in the form of an annular shape and intervenes between the contact surfaces of the hub flange 40 and the disc plates 32, 33.

The thrust member 34 is constituted by a first thrust member 34a intervening between the contact surfaces of the hub flange 40 and the disc plate 33, a second thrust member 34b intervening between the contact surfaces of the hub flange 40 and the disc plate 32, and a disc spring 34c intervening between the first thrust member 34a and the disc plate 33.

The disc spring 34c functions to urge the first thrust member 34a toward the hub flange 40 to have the disc plates 32, 33 brought into friction contact with the hub flange 40, thereby generating a hysteresis torque between the hub flange 40 of the hub member 31 and the disc plates 32, 33. Further, the disc spring 34c may be constituted by other urging means.

The disc 36 is constituted by an annular disc and extends radially outwardly of the outer peripheries of the disc plates 32, 33. The radially inward portion of the disc 36 is positioned between and retained by the rivets 46 to be connected with the disc plates 32, 33.

The friction members 37a, 37b are secured to the axial both ends of the disc 36 by an adhesive material and the like, and the friction surfaces of the friction members 37a, 37b are positioned between and retained by the first plate 43 and the second plate 44.

The limiter portion 23 is constructed to include the first plate 43, the second plate 44, the disc spring 45, and the rivets 46. There are some cases in which the limiter portion 23 is construed to include the friction members 37a, 37b of the damper mechanism 22.

The first plate 43 is secured to the flywheel 25 through the support member 24 by bolts 47.

The second plate 44 is held in engagement with the friction member 37a of the damper mechanism 22 from the side of the support member 24, and the disc spring 45 intervenes between support member 24 and the second plate 44 to urge the second plate 44 in the direction in which the second plate 44 is spaced away from the support member 24.

The urging force of the disc spring 45 causes the friction members 37a, 37b of the damper mechanism 22 to be retained by the first plate 43 and the second plate 44, so that the support member 24 and the damper mechanism 22 are brought into the friction engagement with each other.

On the other hand, the disc plates 32, 33 are provided with stopper portions 48, respectively, which are constituted by connection portions of the disc 36 and the disc plates 32, 33 connected with each other by the rivets 38.

The connection portions of the disc 36 and the disc plates 32, 33, viz., the stopper portions 48 numbers four in the circumferential direction of the disc plates 32, 33 to be positioned on the rotation paths of the radially outer peripheral portions of the projection portions 40A. Further, each of the stopper portions 48 may be constituted by only the connection portion of the disc plates 32, 33.

Each of the stopper portions 48 is provided with a positive engagement surface 48a engageable with the positive side surface 40b of the projection portion 40A and a negative engagement surface 48b engageable with the negative side surface 40c of the projection portion 40A when the hub member 31 is twisted in the positive side and the negative side with respect to the disc plates 32, 33. The engagement of the positive engagement surface 48a with the positive side surface 40b, and the engagement of the negative engagement surface 48b with the negative side surface 40c cause the torsions of the hub member 31 and the disc plates 32, 33 to be regulated.

As will be clear from the foregoing description, in the present embodiment, the positive side surface 40b forming one circumferential side surface of the projection portion 40A constitutes one circumferential surface facing the positive torsion direction when the hub member 31 is twisted in the positive side with respect to the disc plates 32, 33, while the negative side surface 40c forming the other circumferential side surface of the projection portion 40A constitutes the other circumferential surface facing the negative torsion direction when the hub member 31 is twisted in the negative side with respect to the disc plates 32, 33.

The positive side surface 40b and the negative side surface 40c of the projection portion 40A, and the positive engagement surface 48a and the negative engagement surface 48b of the stopper portions 48 are tapered and inclined in the same directions. The positive engagement surface 48a and the negative engagement surface 48b of the stopper portions 48 are provided with resilient members, respectively.

Thus, the resilient members serve to absorb the shocks generated when the positive side surface 40b and the negative side surface 40c of the projection portion 40A are brought into engagement with the positive engagement surface 48a and the negative engagement surface 48b of the stopper portions 48, respectively.

Accordingly, the projection portion 40A and the stopper portion 48 are suppressed from being damaged and from generating impact noises.

Figure 4:
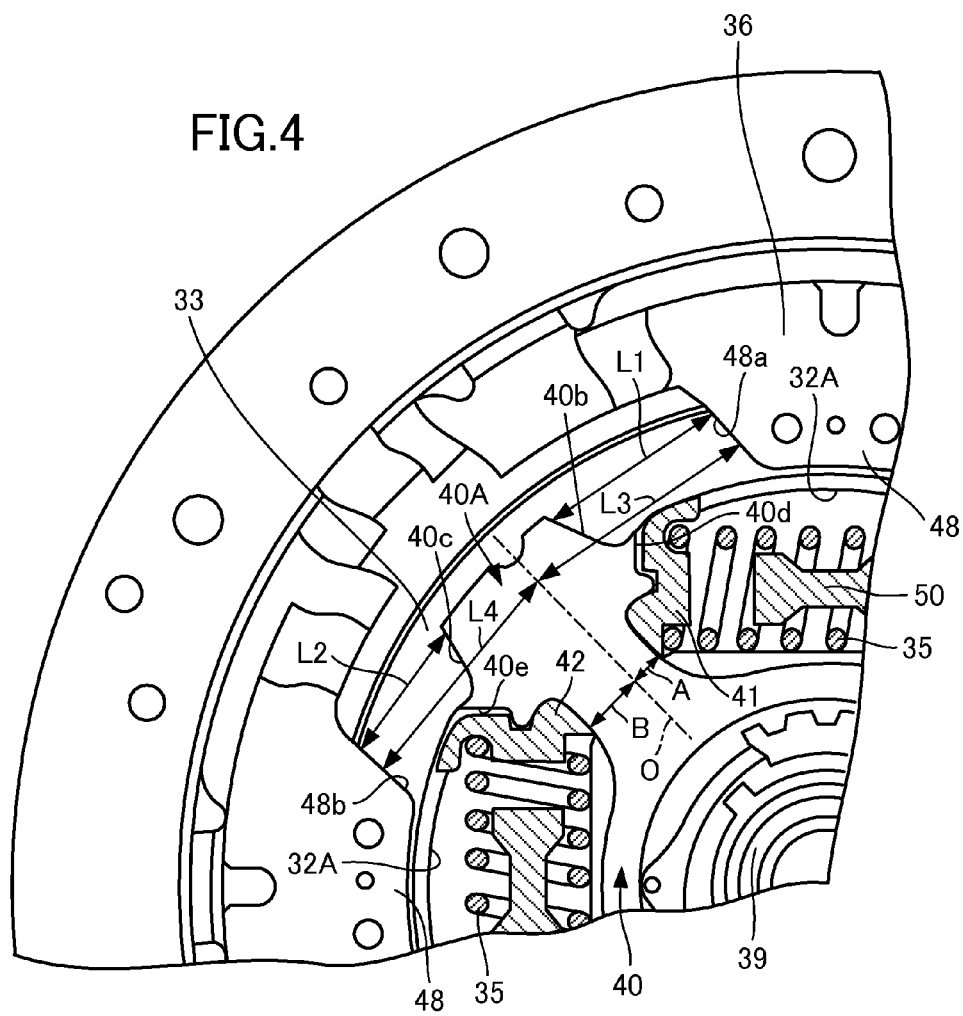
FIG. 4 is a view showing one embodiment of the torsion vibration damping apparatus according to the present invention, and is a front view of an essential portion of the torsion vibration damping apparatus.

As shown in FIGS. 1, 3 and 4, the projection portion 40A is formed with the projection amount of circumferentially projecting in the positive side in the torsion direction from the radially center axis O of the projection portion 40A being smaller than the projection amount of circumferentially projecting in the negative side in the torsion direction from the radially center axis O of the projection portion 40A, so that the projection portion 40A is in an asymmetrical shape across the radially center axis O.

As shown in FIG. 4, the radially center axis O of the projection portion 40A is set to be equally spaced apart from the positive side surface 48a and the negative side surface 48b of the stopper portion 48 with the distance L3 between the radially center axis O and the positive side surface 48a of the stopper portion 48 being equal to the distance L4 between the radially center axis O and the negative side surface 48b of the stopper portion 48 when the hub member 31 and the disc plates 32, 33 are in a state not twisted with each other, viz., assume respective neutral positions at a torsion angle of zero degree.

This means that the distance L1 between the positive side surface 40b and the positive side surface 48a of the stopper portion 48 is longer than the distance L2 between the negative side surface 40c and the negative side surface 48b of the stopper portion 48.

Accordingly, the rotation amount of the hub member 31 twisted (relatively rotated) from the neutral position to its position in which the positive side surface 40b of the projection portion 40A is engaged with the positive side surface 48a of the stopper portion 48 is made larger than the rotation amount of the hub member 31 twisted from the neutral position to its position in which the negative side surface 40c of the projection portion 40A is engaged with the negative side surface 48b of the stopper portion 48.

The deformation amount of the coil spring 35 deformed when the positive side surface 40b of the projection portion 40A is engaged with the positive side surface 48a of the stopper portion 48 is made larger than the deformation amount of the coil spring 35 deformed when the negative side surface 40c of the projection portion 40A is engaged with the negative side surface 48b of the stopper portion 48.

The operation will be described hereinafter.

In the case that the internal combustion engine is operated, the support member 24 is rotated integrally with the flywheel 25 in response to the driving of the output shaft 26. In the range of the torque being smaller than the predetermined value (limit torque value), the torque from the internal combustion engine is transmitted to the disc 36 and the disc plates 32, 33 of the damper mechanism 22 through the limiter portion 23, so that the damper mechanism 22 can be rotated.

The torque transmitted to the disc plates 32, 33 is transmitted to the boss 39 from the hub flange 40 through the coil spring 35 and the thrust member 34, so that the hub member 31 can be rotated while the coil spring 35 is resiliently deformed in response to the torque transmitted to the boss 39. In this way, the driving force of the output shaft 26 is transmitted to the input shaft 27 through the coil spring 35. As a consequence, the torque is transmitted to the drive transmission system from the internal combustion engine.

Here, the description will be directed to the actions in the cases of the hub member 31 being twisted in the positive and negative sides with respect to the disc plates 32, 33. Here, the rotation direction of the disc plates 32, 33 is assumed to be a direction shown by R1 when the torque is transmitted from the internal combustion engine.

When the vehicle is accelerated to have the rotation fluctuation of the internal combustion engine become large, the relative rotation amount of the disc plates 32, 33 and the hub member 31 becomes large, viz., the torsion angle becoming large. This means that the hub member 31 is twisted in the positive side with respect to the disc plates 32, 33 to have the coil spring 35 compressed and to have the toque transmitted to the hub member 31 from the disc plates 32, 33.

When the torsion angle of the disc plates 32, 33 and the hub member 31 becomes large, the hub member 31 is twisted in the R2 direction (positive side) with respect to the disc plates 32, 33 as the disc plates 32, 33 is rotated in the R1 direction.

The actions of the disc plates 32, 33 and the hub member 31 will be explained with reference to FIGS. 5 to 8 and FIG. 11. The disc plate 33 is not shown in FIG. 6, however, the disc plate 33 is moved in parallel relationship with the disc plate 32, and thus is moved in the same action as that of the disc plate 32.

Figure 6:
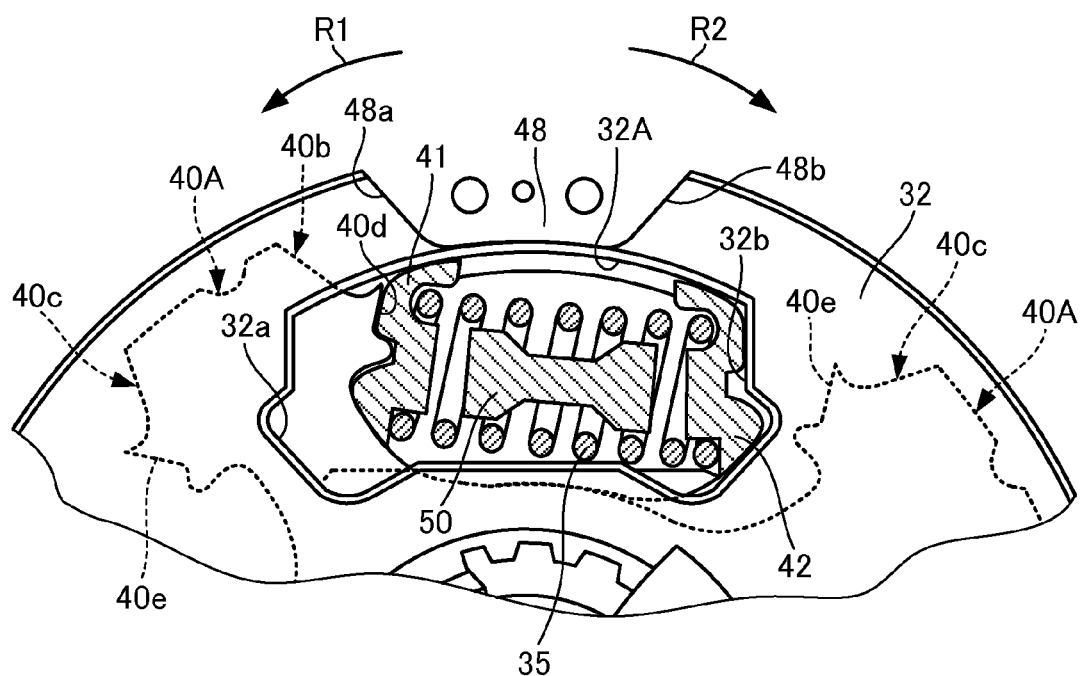
FIG. 6 is a view showing one embodiment of the torsion vibration damping apparatus according to the present invention, and is a view showing a positional relationship between the recess of the projection portion and the accommodation hole in the disc plates at the time of the hub member being twisted in the acceleration side with respect to disc plates.

When the disc plates 32, 33 are rotated in the R1 direction in FIGS. 5 and 6, the end portions 32b, 33b of the accommodation holes 32A, 33A of the disc plates 32, 33 pressurize the sheet member 42 toward the sheet member 41. At this time, the fit portion 40e of the projection portion 40A is spaced apart from the sheet member 42.

When the hub member 31 is twisted in the R2 direction (positive side) with respect to the disc plates 32, 33, the fit portion 40d of the projection portion 40A pressurizes the sheet member 41 toward the sheet member 42. At this time, the sheet member 41 is spaced apart from the end portions 32a, 33a of the accommodation holes 32A, 33A.

In the state that the hub member 31 begins to be twisted in the R2 direction with respect to the disc plates 32, 33, the fit portion 40d of the projection portion 40A and the sheet member 41 are firmly fitted with each other from the state being loosely fitted with each other, while the end portions 32b, 33b of the accommodation holes 32A, 33A are firmly fitted with each other from the state being loosely fitted with each other, so that the hub member 31 can be twisted in the R2 direction to the torsion angle $\theta 1$ with respect to the disc plates 32, 33.

After the firmly fitting operations are performed, the coil spring 35 begins to be compressed in the angular range exceeding the torsion angle $\theta 1$ of the hub member 31 and the disc plates 32, 33.

The compression of the coil spring 35 causes the torque of the internal combustion engine is transmitted to the hub member 31 from the disc plates 32, 33 while the torque fluctuation of the internal combustion engine is being damped.

Figure 7:
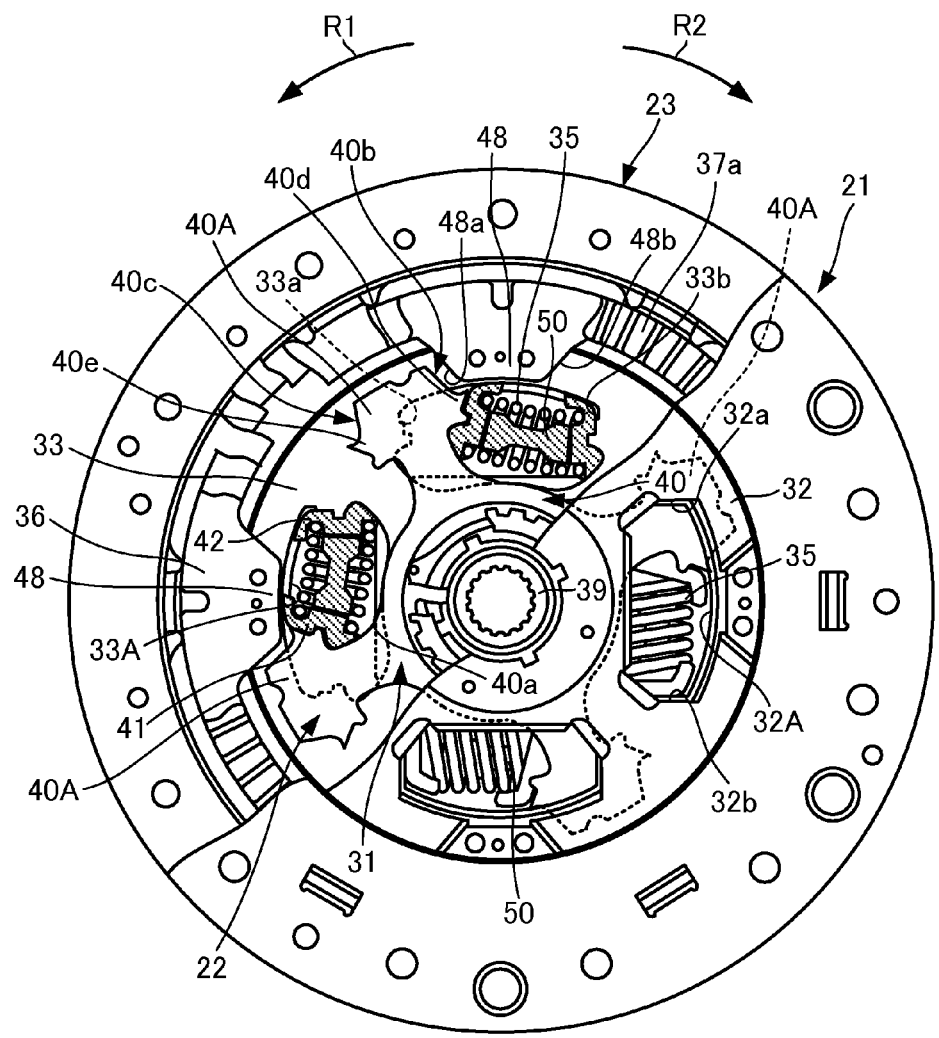
FIG. 7 is a view showing one embodiment of the torsion vibration damping apparatus according to the present invention, and is a view showing a state in which the hub member is further twisted in the acceleration side with respect to the disc plates from the state shown in FIG. 5.

When the torsion angle $\theta$ of the disc plates 32, 33 and the hub member 31 further becomes large to the torsion angle $\theta 2$, the sheet members 41, 42 are brought into engagement with the torsion damper 50 as shown in FIG. 7. In the range exceeding the torsion angle $\theta 2$, both of the coil spring 35 and the torsion damper 50 are compressed to increase the torsion rigidity.

In this way, the torque to be transmitted to the hub member 31 through the disc plates 32 through the internal combustion engine becomes large, the coil spring 35 and the torsion damper 50 are compressed, so that the torque of the internal combustion engine is transmitted to the hub 31 from the disc plates 32, 33 while the torque fluctuation of the internal combustion engine is being damped.

Figure 8:
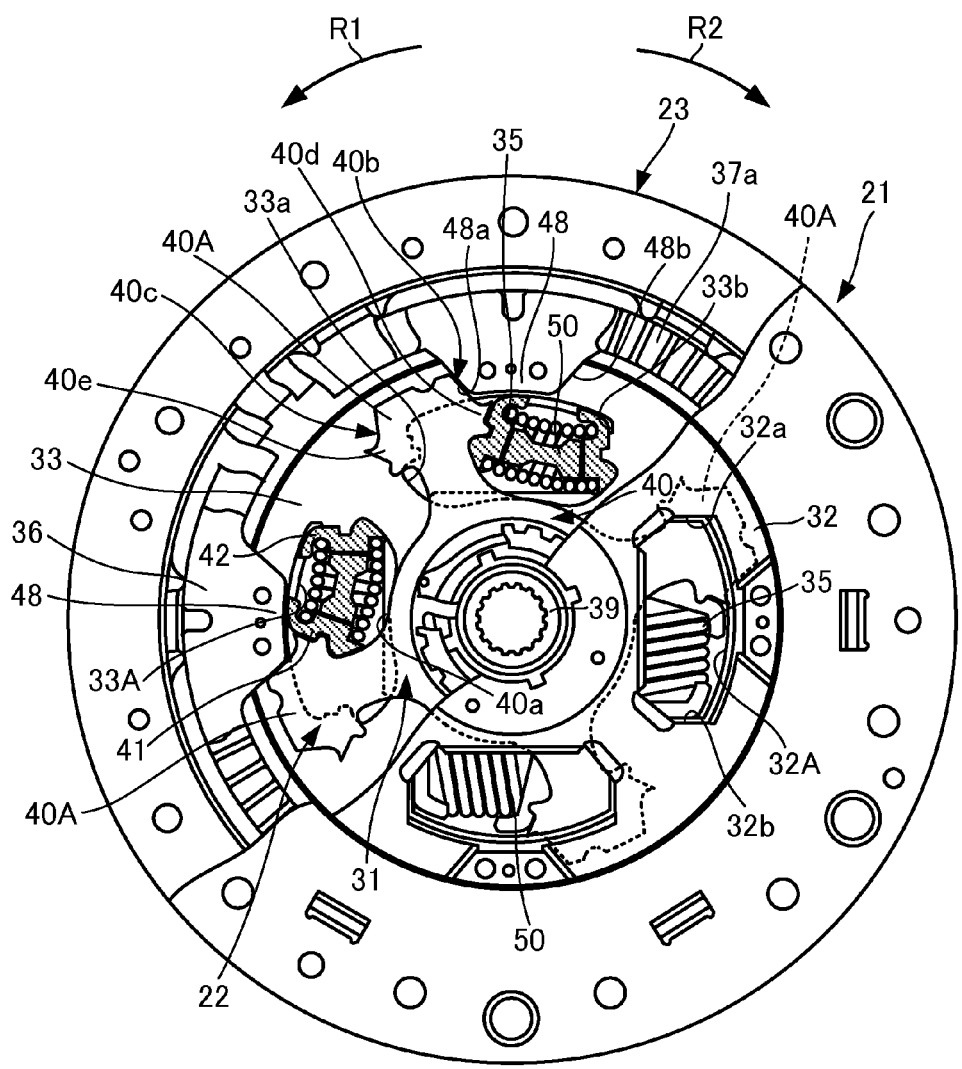
FIG. 8 is a view showing one embodiment of the torsion vibration damping apparatus according to the present invention, and is a view showing a state in which the hub member is further twisted toward the acceleration side with respect to the disc plates from the state shown in FIG. 7 to have the projection portion brought into engagement with the stopper portion.

When the torsion angle $\theta$ of the disc plates 32, 33 and the hub member 31 further becomes large to the torsion angle $\theta 4$, the positive side surface 40b of the projection portion 40A is brought into engagement with the positive side engagement surface 48a of the stopper portion 48, thereby causing the hub member 31 and the disc plates 32, 33 to be regulated from being twisted as shown in FIG. 8.

When the positive side surface 40b of the projection portion 40A is brought into engagement with the positive side engagement surface 48a of the stopper portion 48, the torque between the damper mechanism 22 and the flywheel 25 reaches the predetermined value (limit torque value), so that the friction members 37a, 37b frictionally slide with respect to the first plate 43 and the second plate 44. The sliding action causes the disc plates 32, 33 and the hub member 31 not to transmit the torque exceeding the limit torque value.

On the other hand, the torque of the internal combustion engine become small at the time of the deceleration of the vehicle, and the engine brake is generated, so that the torque is inputted to the hub member 31 from the input shaft 27 of the transmission.

When the rotation fluctuation of the internal combustion engine at the deceleration of the vehicle becomes large, the torsion angle between the disc plates 32, 33 and the hub member 31 becomes large, so that the hub member 31 is twisted in the negative side (R1 side) from the neutral position with respect to the disc plates 32, 33, thereby causing the coil spring 35 to be compressed to transmit the torque from the hub member 31 to the disc plates 32, 33.

The actions of the disc plates 32, 33 and the hub member 31 at this time will be explained with reference to FIGS. 9 and 10.

Figure 9:
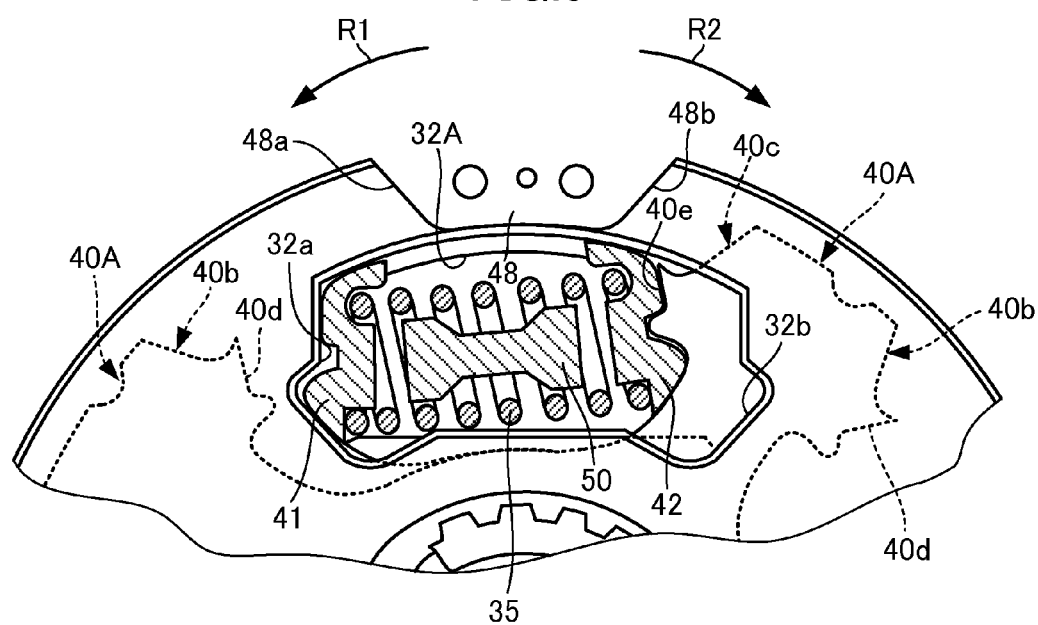
FIG. 9 is a view showing one embodiment of the torsion vibration damping apparatus according to the present invention, and is a view showing a positional relationship between the recess of the projection portion and the accommodation hole in the disc plates at the time of the hub member being twisted in the deceleration side with respect to disc plates.
Figure 10:
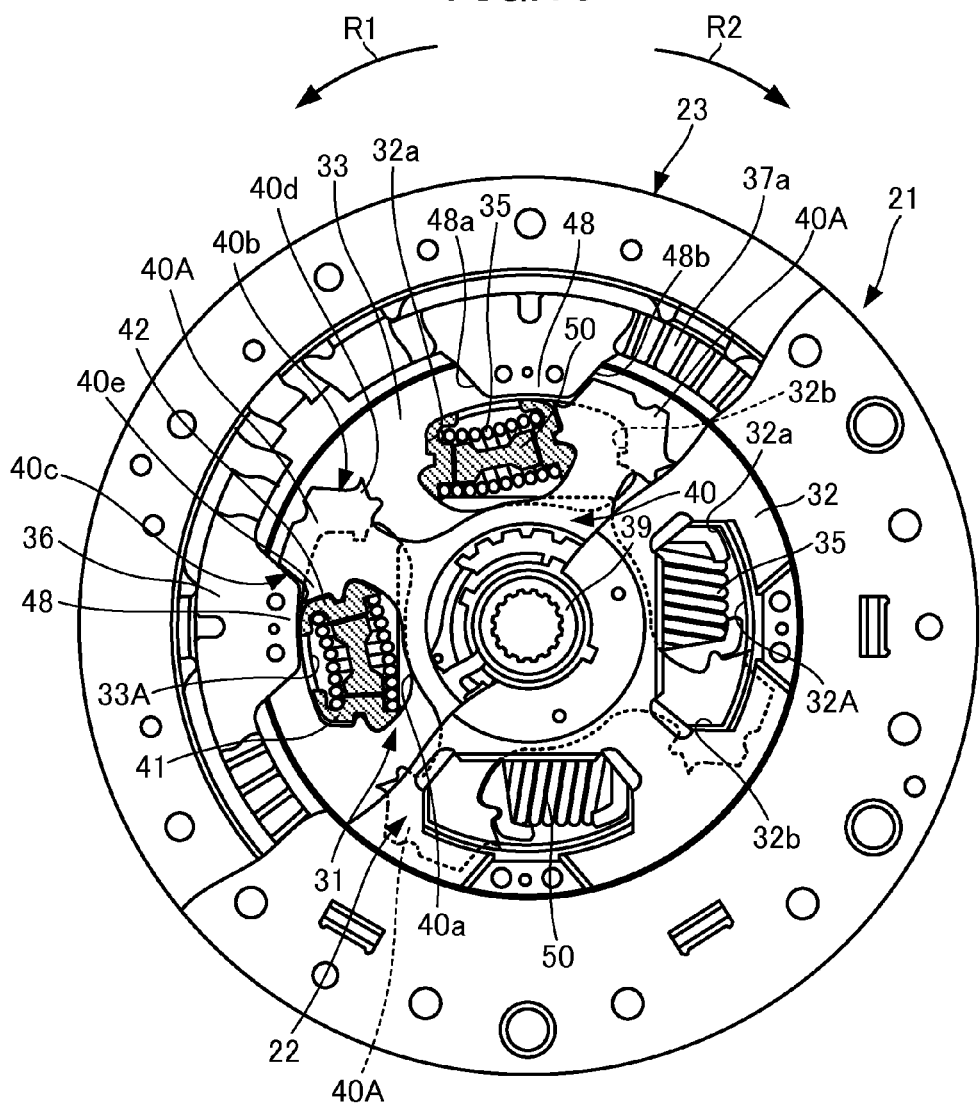
FIG. 10 is a view showing one embodiment of the torsion vibration damping apparatus according to the present invention, and is a view showing a state in which the hub member is twisted in the deceleration side with respect to disc plates.

Here, the disc plate 33 is not shown in FIG. 9, but the disc plate 33 is moved in parallel relationship with the disc plate 32, viz., takes an action the same as that of the disc plate 32.

In FIG. 9, the fit portion 40e of the projection portion 40A pressurizes the sheet member 42 toward the sheet member 41 as the hub member 31 is twisted in the R1 direction (negative side) with respect to the disc plates 32, 33. At this time, the sheet member 42 is spaced apart from the end portions 32b, 33b of the accommodation holes 32A, 33A.

When the hub member 31 is twisted in the R1 direction (negative side) with respect to the disc plates 32, 33, the end portions 32a, 33a of the accommodation holes 32A, 33A pressurize the sheet member 41 toward the sheet member 42. At this time, the fit portion 40d of the projection portion 40A is spaced apart from the sheet member 41.

Figure 11:
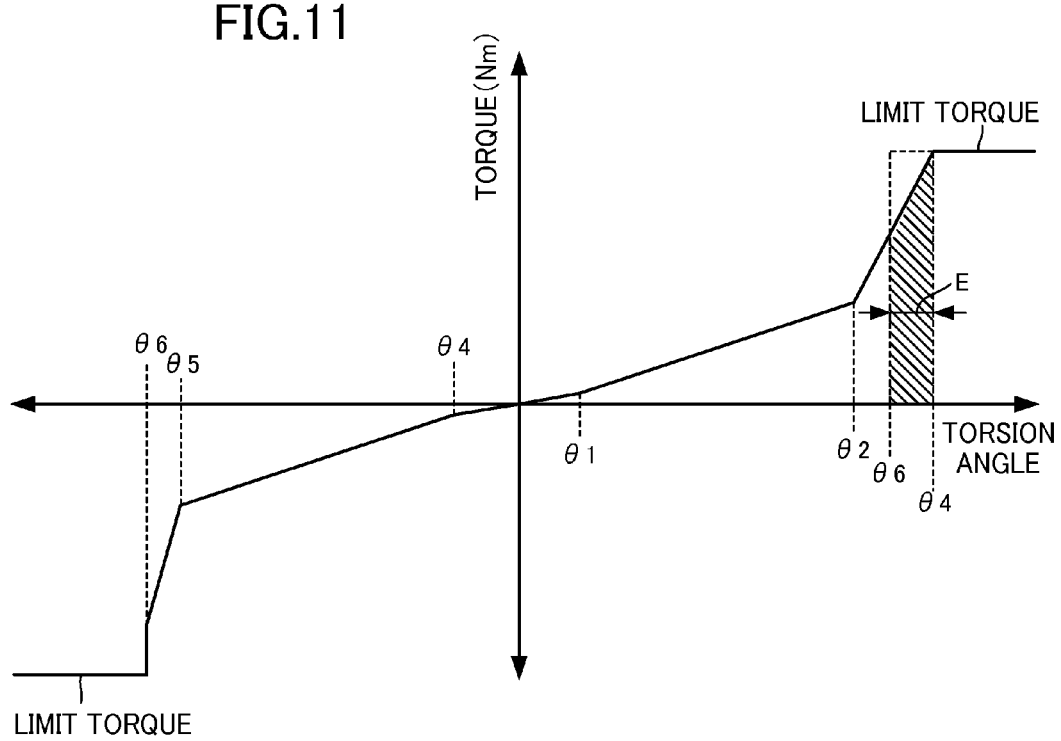
FIG. 11 is a view showing one embodiment of the torsion vibration damping apparatus according to the present invention, and is a view showing a torsion property of the torsion vibration damping apparatus.
Figure 12:
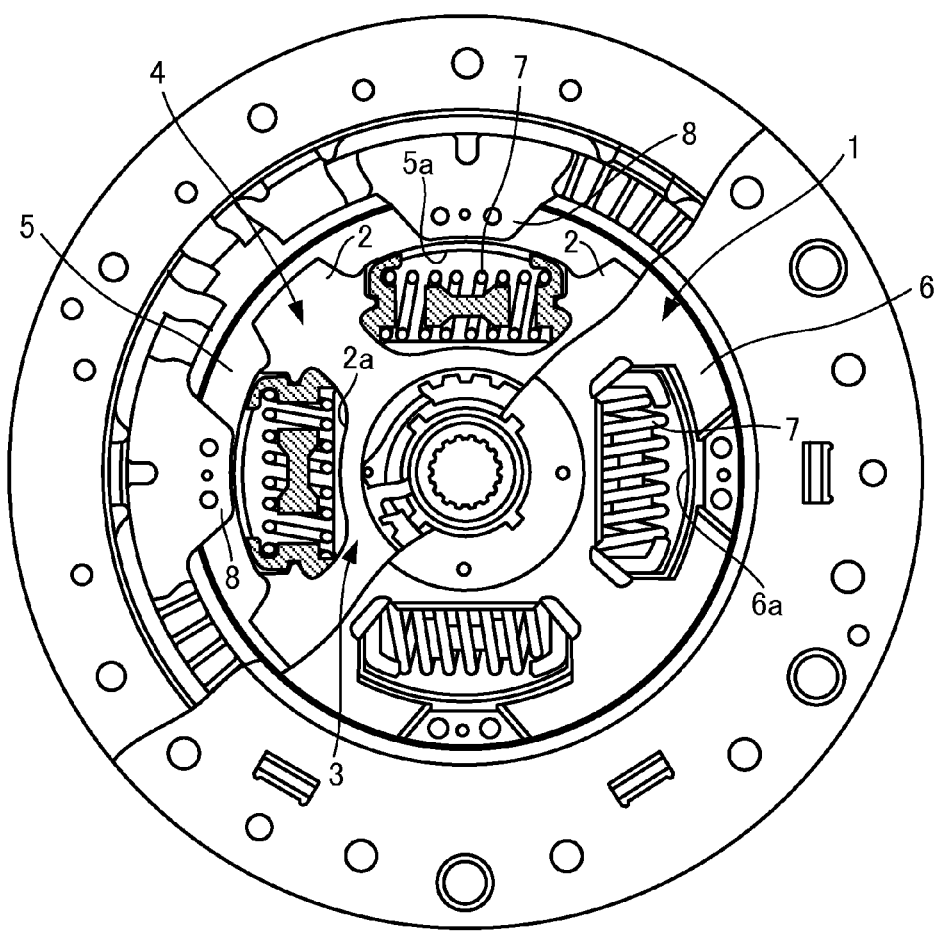
FIG. 12 is a front view of a conventional torsion vibration damping apparatus.

In the state that the hub member 31 begins to be twisted in the R1 direction with respect to the disc plates 32, 33 as shown in FIG. 11, the fit portion 40e of the projection portion 40A and the sheet member 42 are firmly fitted, while the end portions 32b, 33b of the accommodation holes 32A, 33A and the sheet member 41 are also loosely fitted, thereby causing the hub member 31 and disc plates 32, 33 to be twisted to the torsion angle θ4.

In the range exceeding the torsion angle θ4 between the hub member 31 and the disc plates 32, 33 after the loosely fittings are carried out, the coil spring 35 is compressed.

The compression of the coil spring 35 causes the torque to be transmitted from the hub member 31 to the disc plates 32, 33 while the torque fluctuation of the internal combustion engine is being damped.

When the torsion angle θ of the disc plates 32, 33 and the hub member 31 further becomes large to the torsion angle θ5, the sheet members 41, 42 are brought into engagement with the torsion damper 50, thereby causing the coil spring 35 and the torsion damper 50 to be compressed to have the torsion rigidity to be enhanced in the range exceeding the torsion angle θ5.

When torque to be transmitted from the disc plates 32, 33 to the hub member 31 further becomes large in this way, the coil spring 35 and the torsion damper 50 are compressed, thereby causing the torque to be transmitted to the disc plates 32, 33 from the hub member 31 while the torque fluctuation of the internal combustion engine is being damped.

When the torsion angle θ of the disc plates 32, 33 and the hub member 31 further becomes large to the torsion angle θ6, the negative side surface 40c of the projection portion 40A is brought into engagement with the negative side engagement surface 48b of the stopper portion 48, thereby causing the hub member 31 and the disc plates 32, 33 to be regulated from being twisted.

When the torque between the damper mechanism 22 and the flywheel 25 reaches the predetermined value (limit torque value) after the negative side surface 40c of the projection portion 40A is brought into engagement with the negative side engagement surface 48b of the stopper portion 48, the friction members 37a, 37b frictionally slide with respect to the first plate 43 and the second plate 44, thereby causing the torque exceeding the limit torque value not to be transmitted between the disc plates 32, 33 and the hub member 31.

In the present embodiment, the projection amount of the projection portion 40A circumferentially projecting in the positive side from the radially center axis O of the projection portion 40A is smaller than the projection amount of the projection portion 40A circumferentially projecting in the negative side from the radially center axis O of the projection portion 40A, so that the distance L1 between the positive side surface 40b and the positive side surface 48a of the stopper portion 48 is longer than the distance L2 between the negative side surface 40c and the negative side surface 48b of the stopper portion 48 when the hub member 31 and the disc plates 32, 33 are at the neutral positions.

Accordingly, the torsion vibration damping apparatus can be constructed in such a manner that the rotation amount of the hub member 31 rotated from the neutral position to its position at which the positive side surface 40b of the projection portion 40A is engaged with the positive side surface 48a of the stopper portion 48 is made larger than the rotation amount of the hub member 31 rotated from the neutral position to its position at which the negative side surface 40c of the projection portion 40A is engaged with the positive side surface 48b of the stopper portion 48.

Further, the torsion vibration damping apparatus can be constructed in such a manner that the deformation amount of the coil spring 35 deformed when the positive side surface 40b of the projection portion 40A is engaged with the positive side surface 48a of the stopper portion 48 is made larger than the deformation amount of the coil spring 35 deformed when the negative side surface 40c of the projection portion 40A is engaged with the negative side surface 48b of the stopper portion 48.

As will be understood from the foregoing description, the torsion angle of the coil spring 35 in the acceleration side (positive side) is made larger than the torsion angle of the coil spring 35 in the deceleration side (negative side), thereby making it possible to dispose the coil spring 35 long in the circumferential direction within the recess 40a and the accommodation holes 32A, 33A of the disc plates 32, 33 between the projection portions 40A.

Figure 13:
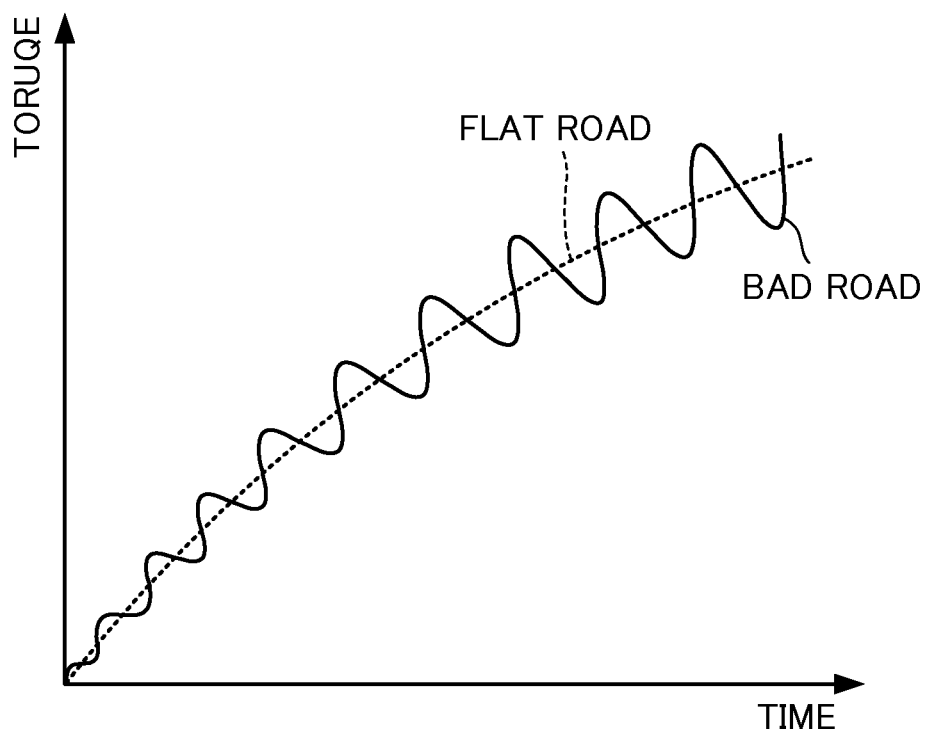
FIG. 13 is a view showing torques generated when the vehicle is cruising and accelerating on the flat and bad roads.

Therefore, in the case that the speed fluctuation of the wheels is generated to cause the transitional torque to be inputted as shown in a solid line in FIG. 13 as in the case of the cruising condition of the vehicle from the flat road to the bad road at the time of the acceleration side cruising condition, the coil spring 35 can be deformed with the resilient deformation amount being made large, thereby making it possible to lower the rigidity of the coil spring 35 and to enhance the damping property of the torsion vibration at the time of the acceleration side cruising condition.

More concretely, as shown in FIG. 11, in the case that the torsion angles of the hub member 31 and the disc plates 32, 33 in the acceleration and deceleration sides are identical to each other as in the conventional torsion vibration damping apparatus, the hub member 31 is twisted in the acceleration side with respect to the disc plates 32, 33 at the torsion angle θ6 to have the positive side surface 40b of the projection portion 40A engaged with the positive side surface 48a of the stopper portion 48.

In contrast, in the present embodiment, because of the fact that the projection amount of the projection portion 40A circumferentially projecting in the positive side from the radially center axis O of the projection portion 40A is smaller than the projection amount of the projection portion 40A circumferentially projecting in the negative side from the radially center axis O of the projection portion 40A, so that the distance L1 between the positive side surface 40b and the positive side surface 48a of the stopper portion 48 is longer than the distance L2 between the negative side surface 40c and the negative side surface 48b of the stopper portion 48 when the hub member 31 and the disc plates 32, 33 are at the neutral positions, the positive side surface 40b of the projection portion 40A can be brought into engagement with the positive side engagement surface 48a of the stopper portion 48 at the torsion angle θ4 when the hub member 31 is twisted in the acceleration side with respect to the disc plates 32, 33.

Accordingly, the torsion angle in the acceleration side of the hub member 31 is made larger by (θ1+θ2+θ4)−(θ1+θ2+θ6) than the torsion angle in the deceleration side of the hub member 31 twisted with respect to the disc plates 32, 33, thereby making it possible to increase the absorption energy of the vibration by the energy E.

This means that the hub member 31 can be twisted in the accelerated side by (θ1+θ2+θ4)−(θ1+θ2+θ6) with respect to the disc plates 32, 33 as compared with the conventional torsion vibration apparatus when a transitionally large torque is inputted to the drive transmission system.

The torsion vibration damping apparatus according to the present embodiment is constructed only in such a manner that the projection amount of the projection portion 40A circumferentially projecting in the acceleration side from the radially center axis O of the projection portion 40A is only smaller than the projection amount of the projection portion 40A circumferentially projecting in the deceleration side from the radially center axis O of the projection portion 40A, so that the torsion angle in the acceleration side can be made larger than the torsion angle in the deceleration side, thereby making it unnecessary to make small the circumferential width of the projection portion 40A in the acceleration and deceleration sides.

Especially as shown in FIG. 4, it is sufficient that the circumferential width A of the base portion of the projection portion 40A is only made small as compared with the circumferential width B of the base portion of the projection portion 40A, and it is unnecessary that the whole circumferential width A of the base portion of the base portion of the projection portion 40A is made small in the acceleration and deceleration sides.

As a consequence, the strength of the projection portion 40A is prevented from being lowered, thereby making it possible to reduce the size of the torsion vibration damping apparatus.

The present embodiment is constructed with the limiter portion 23 being provided at the radially outer peripheral portion of the disc plates 32, 33 to be held in friction engagement with the flywheel 25 to which the torque is transmitted from the internal combustion engine, and with the boss 39 of the hub member 31 being connected with the input shaft 27 of the drive transmission system, so that the limiter portion 23 can slide with respect to the flywheel 25 when the torque between the flywheel 25 and the input shaft 27 exceeds the predetermined value.

Accordingly, it is possible to prevent the transitional torque from being transmitted between the internal combustion engine and the drive transmission system when the hub member 31 is twisted in the acceleration and deceleration sides with respect to the disc plates 32, 33, thereby making it possible to protect the torsion vibration damping apparatus 21.

Further, the torsion vibration damping apparatus 21 according to the present embodiment is constructed with a hybrid damper; however, the present invention is not limited to the above construction. The torsion vibration damping apparatus may be provided in a clutch apparatus which functions to connect and disconnect the driving force between the flywheel and the transmission.

Further, the present invention may be applied to a torsion vibration damping apparatus such as a lockup damper intervening between a lockup clutch apparatus of a torque converter and the transmission gear assembly.

As has been explained in the foregoing description, the torsion vibration damping apparatus according to the present invention has such an advantage that the vibration damping apparatus can damp the torsion vibration caused by the transitional torque when the hub member is relatively rotated in the positive side with respect to the rotation member, while preventing the strength of the projection portion from being lowered even if the torsion vibration damping apparatus is made small in size, and can enhance the damping property of the torsion vibration. The torsion vibration damping apparatus according to the present invention is useful as a torsion vibration damping apparatus and the like which can damp the vibration while transmitting the driving force between the boss member and the rotation member through the resilient member.

EXPLANATION OF REFERENCE NUMERALS

21: torsion vibration damping apparatus
23: limiter portion
25: flywheel (transmission portion)
27: input shaft
31: hub member
32, 33: disc plates (rotation member)
32A, 33A: accommodation holes
35: coil spring (resilient member)
40: hub flange
40A: projection portion
40b: positive side surface (positive circumferential surface)
40c: negative side surface (negative circumferential surface)
41, 42: sheet members
48: stopper portion

The invention claimed is:

1. A torsion vibration damping apparatus, comprising:
  a hub member having a hub flange formed with a plurality of projection portions radially extending and circumferentially spaced apart from one another through recesses,
  a rotation member coaxially provided and relatively rotatable with the hub member, and formed with accommodation holes positioned in opposing relationship with the recesses, respectively, a plurality of resilient members respectively arranged in the recesses and the accommodation holes, and resiliently deformable to establish a torque transmission between the hub member and the rotation member when the hub member is circumferentially rotated in its positive and negative sides relatively with respect to the rotation member from its neutral position in which the hub member is not rotated relatively with respect to the rotation member, and a stopper portion provided on the rotation member to be positioned on the rotation path of each projection portion of the plurality of projection portions, and engageable with circumferential side surfaces of each projection portion to regulate the relative rotation of the hub member and the rotation member when the hub member is rotated in the positive and negative sides relatively with respect to the rotation member, each projection portion being formed with a projection amount circumferentially projected in the positive side from the radially center axis of each projection portion being smaller than a projection amount circumferentially projected in the negative side from the radially center axis of each projection portion so as to be in asymmetrical shape across the radially center axis, and a distance between a positive circumferential side surface of each projection portion and the stopper portion being longer than a distance between a negative side circumferential side surface of each projection portion and the stopper portion when the hub member and the rotation member are in respective neutral positions.

2. The torsion vibration damping apparatus as set forth in claim 1, in which each of the resilient members has both circumferential end portions provided with sheet members, respectively, and the resilient member is arranged in each of the recesses in such a manner that the circumferential one end portion of the resilient member is engageable with the positive circumferential side surface of each projection portion through one of the sheet members, and the circumferential other end portion of the resilient member is engageable with the negative circumferential side surface of each projection portion through the other of the sheet members.

3. The torsion vibration damping apparatus as set forth in claim 1, in which the relative rotation amount of the hub member rotated from the neutral position in the positive side relatively with respect to the rotation member to its position in which the positive circumferential side surface of the projection portion is brought into engagement with the stopper portion is made larger than the relative rotation amount of the hub member rotated from the neutral position in the negative side relatively with respect to the rotation member to its position in which the negative circumferential side surface of the projection portion is brought into engagement with the stopper portion.

4. The torsion vibration damping apparatus as set forth in claim 1, in which the deformation amount of the resilient member deformed when the positive circumferential side surface of each projection portion is brought into engagement with the stopper portion is made larger than the deformation amount of the resilient member deformed when the negative circumferential side surface of each projection portion is brought into engagement with the stopper portion.

5. The torsion vibration damping apparatus as set forth in claim 1, in which the radially outer peripheral portion of the rotation member is provided with a limiter portion held in frictional engagement with a transmission member to which torque is transmitted from a drive source, and the hub member is connected with an input shaft of a drive transmission system, the limiter portion being frictionally slidable with respect to the transmission member when the torque generated between the transmission member and the input shaft exceeds a predetermined value.

6. The torsion vibration damping apparatus as set forth in claim 1, in which the torque from the drive source of a vehicle is transmitted to the rotation member, and the hub member is connected with the input shaft of the drive transmission system, the hub member being twisted in the positive side with respect to the rotation member when the vehicle is being accelerated and in the negative side with respect to the rotation member when the vehicle is being decelerated.

* * * * *